Figure 1:
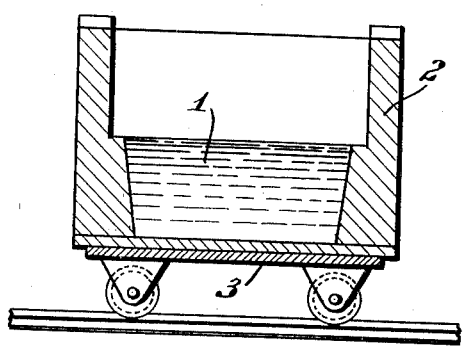
Figure 2:
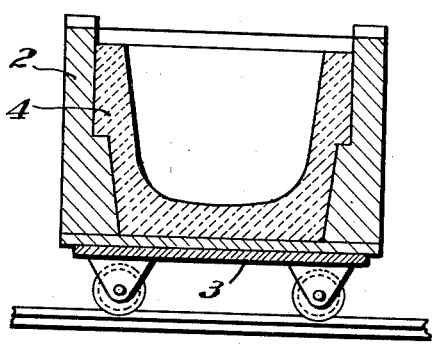

April 15, 1930.  L. SHOWERS  1,754,838
GLASS MELTING POT
Filed Nov. 3, 1927

INVENTOR
Lee Showers
by
James C. Bradley

Patented Apr. 15, 1930

1,754,838

UNITED STATES PATENT OFFICE

LEE SHOWERS, OF CHARLEROI, PENNSYLVANIA, ASSIGNOR TO PITTSBURGH PLATE GLASS COMPANY, A CORPORATION OF PENNSYLVANIA

GLASS-MELTING POT

Application filed November 3, 1927. Serial No. 230,817.

The invention relates to a glass melting pot. The invention has for its objects the provision of a poured pot, (1) which can be arched or burned without cracking without the exercise of any special care or precaution, (2) which will give long service, because of its ability to stand the strains imposed in handling and which at the same time is very resistant to corrosion by the molten glass, and (3) which has the foregoing desirable characteristics even with the largest size pots, which have hitherto been regarded as impracticable to make by a pouring operation. Briefly stated, this result is secured by pouring the pot in two layers, both made from the same batch, but the inner one being composed of materials which are more finely ground than those used in the outside layer.

The more finely ground material gives greater resistance to the corrosion of the glass than the more coarsely ground material, while the outer layer of more coarsely ground material gives a supporting body which will stand the strains imposed by handling better than the more finely divided material and which will not crack in firing, as is apt to occur with a pot composed entirely of the finely divided material, unless unusual care is observed in firing or arching.

The material of the two layers, being of the same batch, have the same amount of expansion under heat and show no tendency to separate under the most severe conditions of use.

The batch employed may vary between certain limits, but preferably comprises the following approximate proportions:

40% raw clay (mixed ball and kaolin clays).
30% sand (part coarse and part fine).
30% pot shell (or other burned clay).

These materials are ground and mixed with water and a deflocculating agent, whereby a maximum degree of fluidity may be secured with a minimum amount of water. The deflocculating agents employed are preferably gallic acid, caustic soda and sodium silicate, as set forth in the Fulton Patent No. 1,398,011, of Nov. 22, 1921, but other agents may be used if desired. The use of these agents gives the mixture sufficient fluidity for pouring when only about 17 per cent of water is used.

For the outside layer of the pot, the ingredients of the batch are preferably ground so that the coarsest particles will pass through a screen having mesh openings about one fourth inch in diameter, while for the inside layer, they are ground so that the coarsest particles will pass through a screen wherein the openings are about one seventh of an inch in diameter, but it will be understood that these dimensions may vary within reasonable limits depending upon conditions. The pot and the method of making it are illustrated in the drawings, wherein:

Figs. 1 to 4 are vertical sections showing the successive steps incident to the formation of the pot. And Fig. 5 is a vertical section through the pot.

In carrying out the operation, the apparatus employed is preferably that shown and described in the Fulton Patent No. 1,364,875 of Jan. 11, 1925. An amount of fluid mix 1 is placed in the mold 2 carried upon the truck 3 and a plunger forced down into the mix to cause it to assume the shape 4 of Fig. 2, the plunger being left in position until the clay sets, thus forming the outer layer of the pot. As heretofore explained, the mix in this case is made from the more coarsely ground material or batch.

Figure 3:
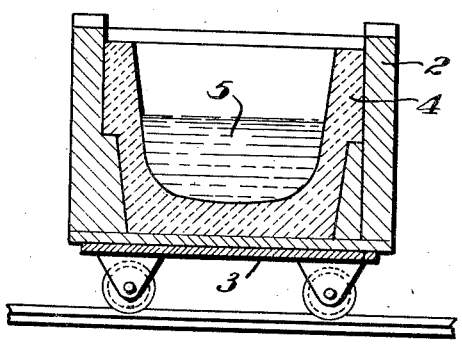
Figure 4:
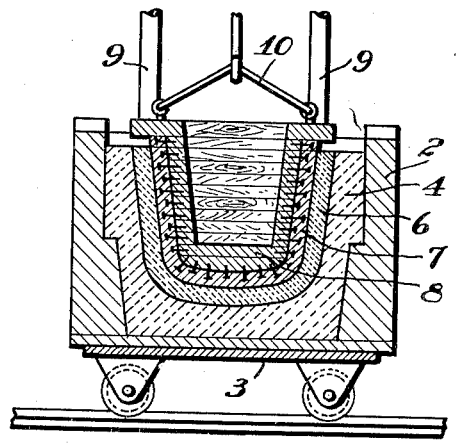
Figure 5:
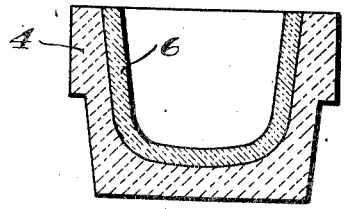

The mix or batch made from the more finely ground batch is now placed in the outer shell 4, as indicated at 5 in Fig. 3 and the plunger shown in Fig. 4 is pressed down into the mix, thus forming it into the inner layer 6. The plunger in this case is the same in construction as the first one used, except that it is necessarily of less diameter. These plungers are constructed and operated, as described in the Fulton Patent No. 1,364,875 heretofore referred to and comprise an outer facing 7 of plaster of Paris and an inner wood support or core 8 of wood, the plunger being forced down by the rods 9, 9 and lifted by the bail 10.

The plunger is left in position until the layer 6 sets, after which it is removed and the pot removed on the truck 3 to the drying room where the outer mold 2 is removed and the pot is allowed to dry out during a long period in the usual way preliminary to firing or arching.

Fig. 5 shows the complete pot with the walls or layers 4 and 6 of the same batch composition, except as to the fineness with which the materials are ground, the inner layer being of finer grain than the outer one and more resistant to corrosion. The two layers of clay apparently weld together or at least form a very close union and no separation occurs either in the firing or arching of the pots preliminary to using them, or in the use of the pots in melting glass. Pots of the largest size for the manufacture of plate glass are made in this way, at a much lower cost than the regular plate glass pots fabricated by the laborious hand method heretofore used, and give the same or better service. The pots are apparently as strong as the hand made pots, can be arched or burned without difficulty, and are very resistant to corrosion by the molten glass, so that the quality of the glass produced compares favorably with that of the hand made pots. The thickness of the walls of this pot at the rim (for plate glass work) is about the same as in the ordinary hand made pot, which is about four inches. The outer layer 4 is shown as thicker than the inner one, but they may be made of the same thickness. Good results have been obtained with an outer wall three inches in thickness with an inner wall one inch in thickness, and also in pots wherein both walls were two inches in thickness. In the pot as illustrated, the thickness of the walls, in proportion to the other dimensions of the pot as shown, is much exaggerated.

What I claim is:

1. A poured glass melting pot of clay composition comprising an outer layer and an inner layer both of substantially the same batch except that the materials of the inner layer are more finely ground than those of the outer layer.

2. A poured glass melting pot of clay composition comprising an outer layer and an inner layer both of substantially the same batch except that the materials of the inner layer are more finely ground than those of the outer layer, such materials including raw clay and burned clay.

3. A poured glass melting pot of clay composition comprising an outer layer and an inner layer both of substantially the same batch except that the materials of the inner layer are more finely ground than those of the outer layer, such materials including raw clay, burned clay and finely divided silica.

In testimony whereof, I have hereunto subscribed my name this 29 day of September, 1927.

LEE SHOWERS.